United States Patent
Hu et al.

(10) Patent No.: US 10,990,297 B1
(45) Date of Patent: Apr. 27, 2021

(54) CHECKPOINTING OF USER DATA AND METADATA IN A NON-ATOMIC PERSISTENT STORAGE ENVIRONMENT

(71) Applicant: EMC IP Holding Company LLC, Hopkinton, MA (US)

(72) Inventors: Ying Hu, Northborough, MA (US); Anton Kucherov, Milford, MA (US); Zvi Schneider, Hod Hasharon (IL); Vladimir Shveidel, Pardes-Hana (IL); Xiangping Chen, Sherborn, MA (US); Felix Shvaiger, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 15/655,977

(22) Filed: Jul. 21, 2017

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 8,234,477 B2* | 7/2012 | Shaath | ............... | G06F 12/1466 711/163 |
| 8,943,024 B1* | 1/2015 | Gardner | ............... | G06F 16/10 707/640 |
| 9,087,006 B2* | 7/2015 | Yochai | ............... | G06F 11/1441 |
| 2013/0227236 A1* | 8/2013 | Flynn | ............... | G11C 16/26 711/165 |
| 2013/0332660 A1* | 12/2013 | Talagala | ............... | G06F 12/0246 711/103 |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Tuan V Thai
*Assistant Examiner* — Alexander J Yoon
(74) *Attorney, Agent, or Firm* — Ryan, Mason & Lewis, LLP

(57) ABSTRACT

An apparatus comprises a storage system having storage devices and an associated storage controller. In conjunction with initiation of a checkpoint, the storage controller sets a checkpoint started flag for the checkpoint, marks user data pages and metadata pages for write operations already entered in a write journal of the storage system as of the setting of the checkpoint started flag as checkpoint pages, and marks user data pages and metadata pages for new write operations entered in the write journal after the setting of the checkpoint started flag as non-checkpoint pages by altering information used to generate signatures for respective ones of the metadata pages. Metadata pages characterizing the same user data pages subject to write operations at different times thereby have different signatures depending on whether or not the checkpoint started flag was set when its corresponding write operation was entered in the write journal.

20 Claims, 7 Drawing Sheets

(56) References Cited

U.S. PATENT DOCUMENTS

2014/0310499 A1\* 10/2014 Sundararaman .... G06F 12/0269
711/203
2016/0034358 A1\* 2/2016 Hayasaka ............. G06F 3/0619
711/113

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.
EMC Corporation, "High Availability, Data Protection and Data Integrity in the XtremIO Architecture," White Paper, Apr. 2015, 28 pages.

\* cited by examiner

```
get_metadata_page(lun_id, offset)
    calculate metadata page_id for (lun_id, offset)
    if it is post-CKPT:
        calculate signature using lowercase 't'
    else:
        calculate signature using uppercase 'T'
    ask D-module for the metadata page based on the signature
    if the metadata page exists:
        return metadata page
    if it is NOT post-CKPT:
        return metadata page does not exist
    //it is post-CKPT, so check if an uppercase 'T' metadata page exists
    calculate signature based on uppercase 'T'
    ask D-module for the metadata page based on the signature
    if the metadata page exists:
        return metadata page
    else:
        return metadata page does not exist
```

FIG. 5

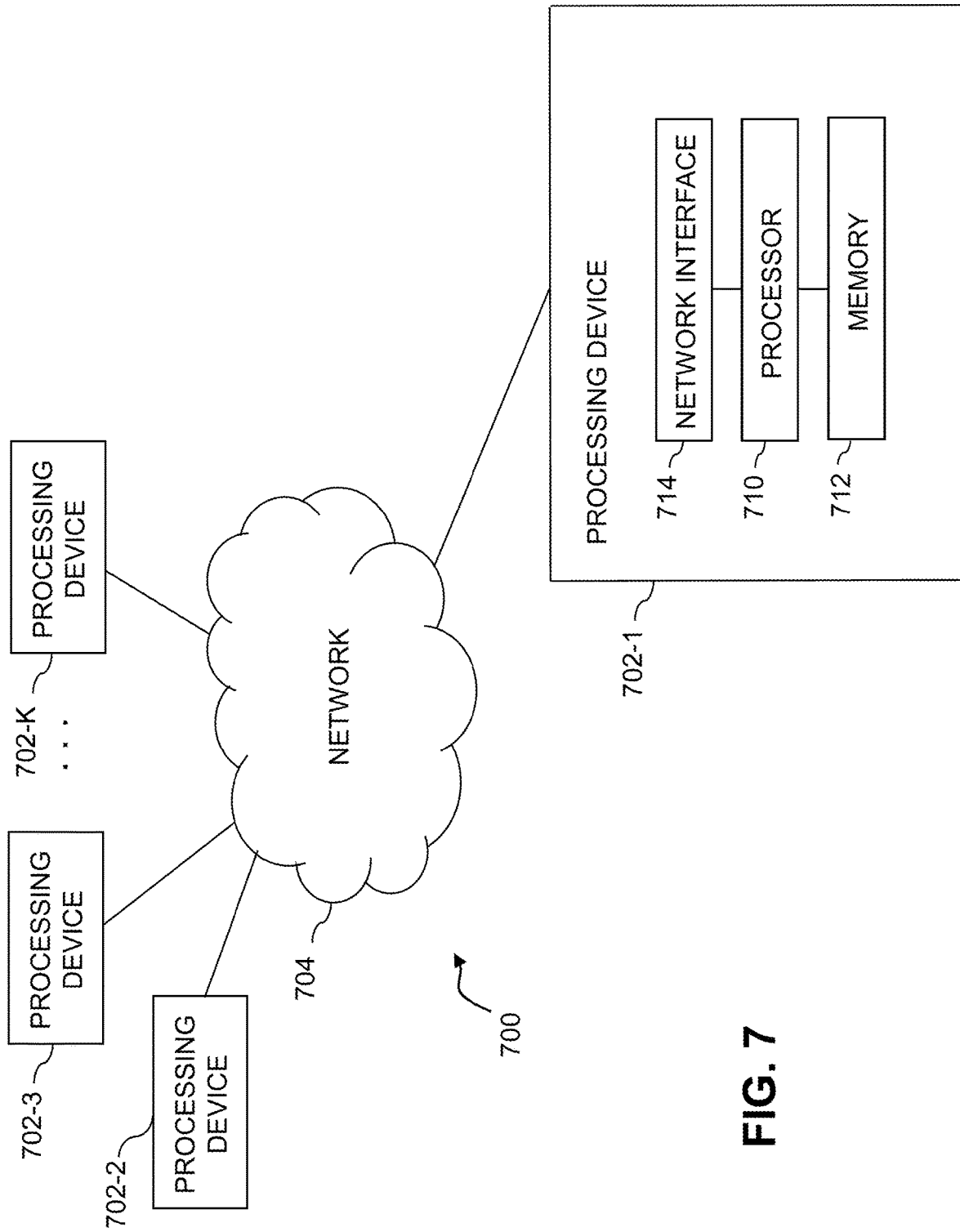

CHECKPOINTING OF USER DATA AND METADATA IN A NON-ATOMIC PERSISTENT STORAGE ENVIRONMENT

FIELD

The field relates generally to information processing systems, and more particularly to storage in information processing systems.

BACKGROUND

Storage systems are often configured to generate periodic checkpoints in order to capture the state of the system at corresponding points in time. Such a checkpointing arrangement allows the system state to be recovered from a previously-captured checkpoint in the event of a storage device failure or other issue arising at a later point in time. However, conventional checkpointing arrangements can be problematic, particularly in non-atomic persistent storage environments such as may be associated with a content addressable storage system comprising an all-flash storage array. For example, some conventional arrangements require that write operations of a given user in a content addressable storage system be interrupted while a checkpoint is generated for that user. Arrangements of this type are inefficient and have a significant adverse impact on the performance of the storage system.

SUMMARY

Illustrative embodiments provide improved techniques for checkpointing of user data and metadata in a non-atomic persistent storage environment provided by a content addressable storage system. For example, in some embodiments, a given checkpoint is initiated responsive to a request from a corresponding user but the user need not suspend its write operations while the given checkpoint is being generated. Instead, the given checkpoint is effectively generated atomically in the non-atomic persistent storage environment of the storage system. Such embodiments can advantageously provide significantly improved efficiency in checkpointing of user data and metadata in a content addressable storage system. Similar advantages can be provided in other types of storage systems.

In one embodiment, an apparatus comprises a storage system having a plurality of storage devices and an associated storage controller. In conjunction with initiation of a checkpoint in the storage system, the storage controller sets a checkpoint started flag for the checkpoint, marks user data pages and metadata pages for write operations already entered in a write journal of the storage system as of the setting of the checkpoint started flag as checkpoint pages, and marks user data pages and metadata pages for new write operations entered in the write journal after the setting of the checkpoint started flag as non-checkpoint pages by altering information used to generate signatures for respective ones of the metadata pages. Metadata pages characterizing the same user data pages subject to write operations at different times thereby have different signatures depending on whether or not the checkpoint started flag was set when its corresponding write operation was entered in the write journal.

For example, altering information used to generate signatures for respective ones of the metadata pages may more particularly comprise changing at least one input of a signature generation algorithm utilized to generate the signatures for the metadata pages from a first value to a second value.

In some embodiments, the storage system comprises a content addressable storage system, and the storage devices comprise non-volatile memory devices such as flash drives. For example, the storage devices in such embodiments can be configured to collectively provide an all-flash storage array.

Additionally or alternatively, the storage system may comprise a clustered storage system having a plurality of storage nodes each having a plurality of storage devices. For example, the storage controller may be implemented in a distributed manner so as to comprise a plurality of distributed storage controller components implemented on respective ones of the storage nodes of the clustered storage system. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIG. 5 shows example pseudocode for retrieving a metadata page based on whether the metadata page is marked as a checkpoint page or a non-checkpoint page in conjunction with generation of a checkpoint in an illustrative embodiment.

FIGS. 6 and 7 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
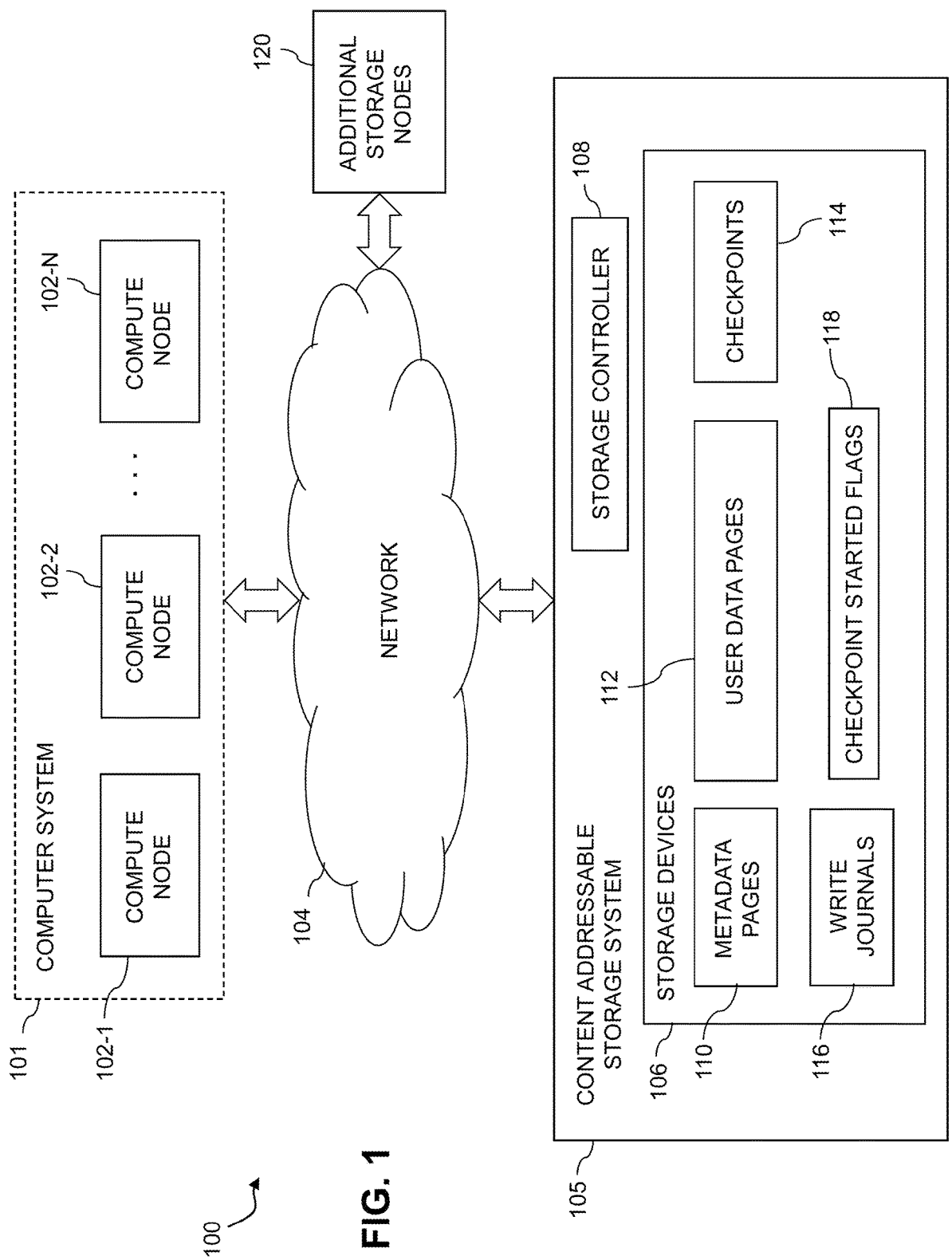
FIG. 1 is a block diagram of an information processing system comprising a content addressable storage system configured for checkpointing of user data and metadata in an illustrative embodiment.

FIG. 1 shows an information processing system 100 configured in accordance with an illustrative embodiment.

The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110, user data pages 112 and checkpoints 114. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

The checkpoints 114 illustratively comprise checkpointed user data pages as well as checkpointed metadata pages. In some embodiments, size limitations or other availability restrictions relating to the metadata area of the storage devices 106 may prevent metadata checkpoints from being stored in the metadata area. Under these and other conditions, it may be necessary to store the checkpointed metadata in the user data area of the storage devices 106. Efficient techniques for checkpointing of metadata into a user data area are disclosed in U.S. patent application Ser. No. 15/637,613, filed Jun. 29, 2017 and entitled "Checkpointing of Metadata into User Data Area of a Content Addressable Storage System," which is incorporated by reference herein.

For example, embodiments of this type utilize multi-level location arrays to efficiently track the particular page locations of checkpointed metadata within the user data area. The multi-level location arrays illustratively include a plurality of page location arrays each having a plurality of entries specifying respective locations of checkpointed metadata pages in the user data area, and one or more array location arrays each indexed by a corresponding set of page location array identifiers specifying respective locations of page location arrays in the user data area. The multi-level location arrays may further comprise one or more higher-level location arrays used to store the locations of the respective ones of the array location arrays. In an arrangement of this type, the page location arrays may be referred to as "level 0" arrays, the array location arrays may be referred to as "level 1" location arrays, and a given one of the higher-level location arrays used to store locations of respective ones of the array location arrays may be referred to as a "level 2" location array.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective pages of user data and corresponding physical locations of the respective pages of the user data in the user data area. The hash metadata generated by the content addressable storage system 105 is illustratively stored in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

As indicated previously, conventional checkpointing arrangements can be problematic, particularly in non-atomic persistent storage environments such as may be associated with a content addressable storage system comprising an all-flash storage array. For example, it may be necessary in such conventional arrangements to suspend all write operations of a given user while a checkpoint is generated for that user. These and other similar conventional arrangements are therefore inefficient and can have a significant adverse impact on the performance of the storage system.

The present embodiment overcomes these and other difficulties of conventional arrangements by providing improved techniques for checkpointing of user data and metadata in the non-atomic persistent storage environment provided by the content addressable storage system 105. For example, checkpointing is implemented for a given user in this embodiment in a manner that does not require the user to interrupt its write operations. Instead, the given checkpoint is effectively generated atomically in the non-atomic persistent storage environment of the storage system, leading to more efficient generation of and recovery from checkpoints within the content addressable storage system 105.

The storage controller 108 of the FIG. 1 embodiment is configured to initiate generation of checkpoints in the content addressable storage system 105. This illustratively includes checkpointing of user data pages and metadata pages. Each of the metadata pages characterizes a plurality of the user data pages.

Figure 2:
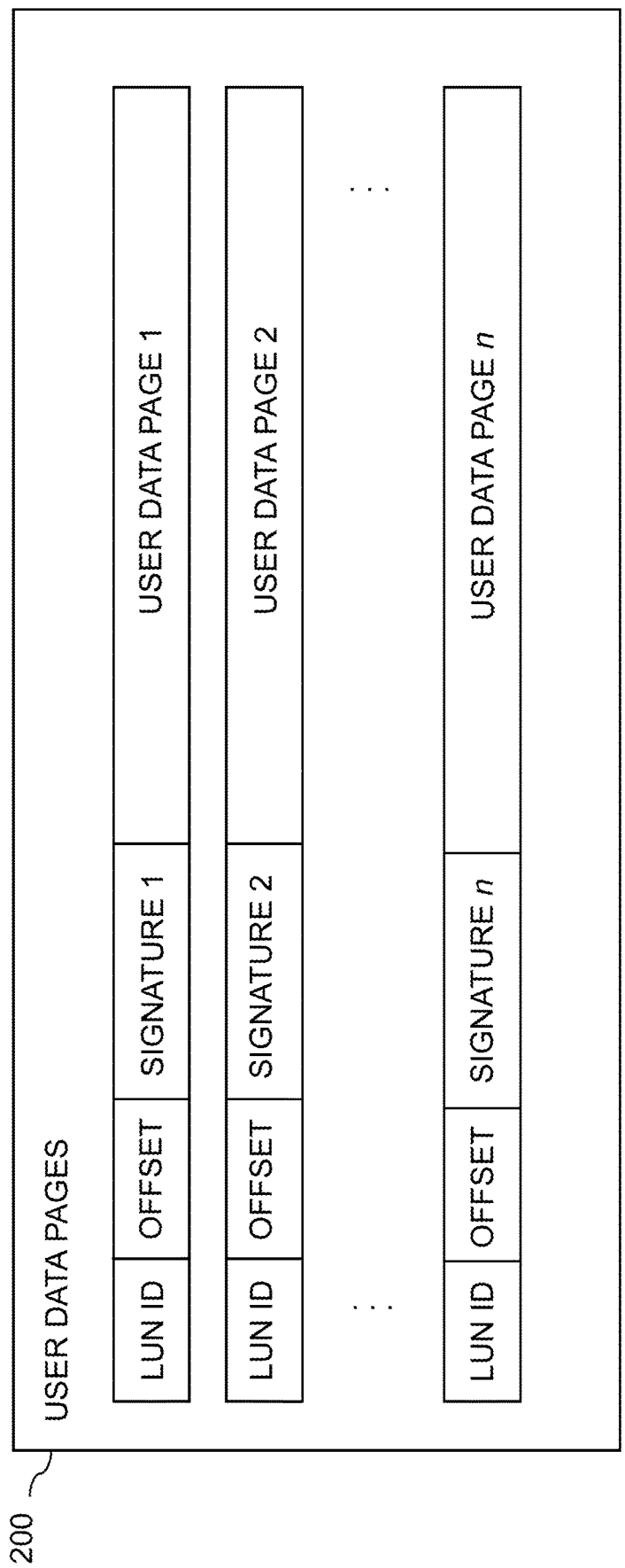
FIG. 2 shows an example of a set of user data pages in an illustrative embodiment.

For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Figure 3:
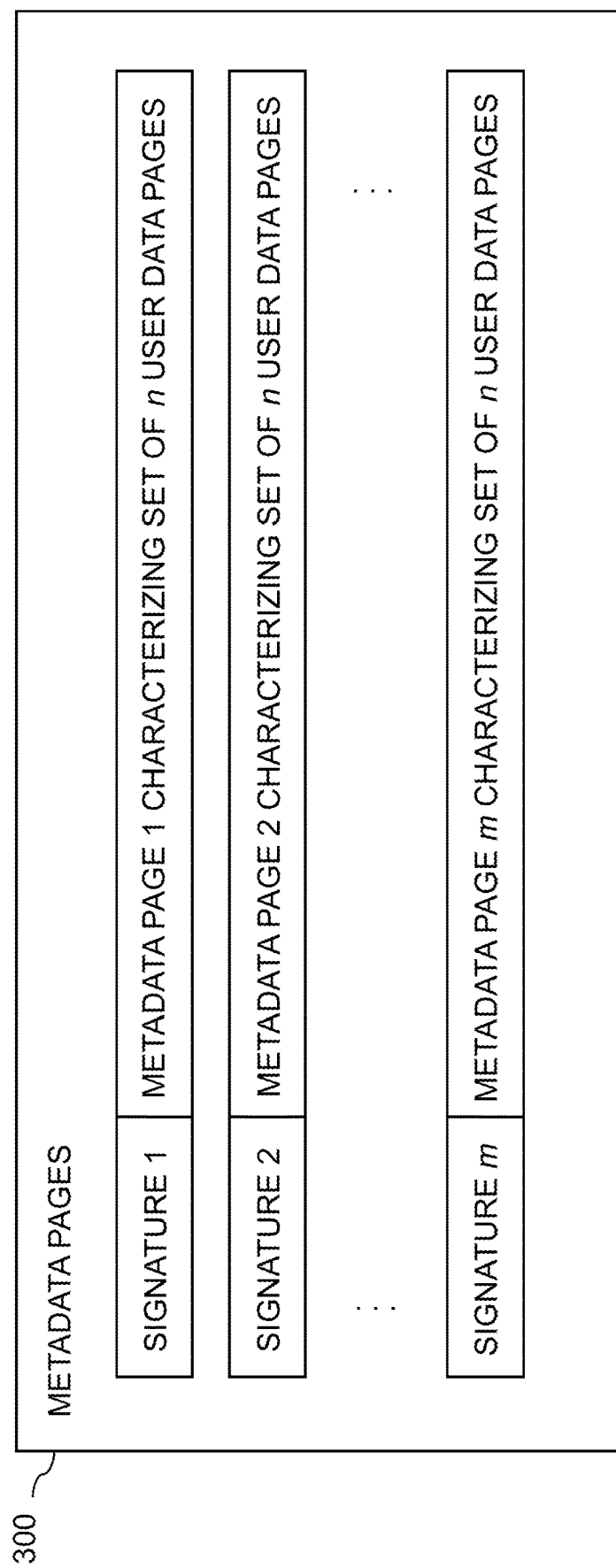
FIG. 3 shows an example of a set of metadata pages in an illustrative embodiment.

Each of the metadata pages in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages. This is illustrated in FIG. 3, which shows a set of metadata pages 300 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The storage devices 106 of the content addressable storage system 105 in the present embodiment are assumed to store a plurality of write journals 116. Each such write journal stores information relating to write operations performed on particular portions of the stored user data and metadata. For example, different write journals may be provided for different users, or for different LUNs of particular users, although a wide variety of other write journal arrangements may be used.

Although the write journals 116 are illustratively shown as being stored on the same storage devices 106 that store the metadata pages 110 and user data pages 112, it is possible for such write journals to be stored in one or more separate storage devices, or in another memory or other component of the content addressable storage system 105.

In conjunction with initiation of a given one of the checkpoints 114 in the content addressable storage system 105, the storage controller 108 is configured to set a corresponding one of a plurality of checkpoint started flags 118 for the given checkpoint. The checkpoint started flags 118 may alternatively be maintained in a system memory or an internal memory of the storage controller 108.

The storage controller 108 marks user data pages and metadata pages for write operations already entered in a given one of the write journals 116 as of the setting of the checkpoint started flag as checkpoint pages.

The storage controller 108 marks user data pages and metadata pages for new write operations entered in the given write journal after the setting of the checkpoint started flag as non-checkpoint pages. This is achieved in illustrative embodiments by altering information used to generate signatures for respective ones of the metadata pages. As a result, metadata pages characterizing the same user data pages subject to write operations at different times thereby have different signatures depending on whether or not the checkpoint started flag was set when its corresponding write operation was entered in the given write journal.

The setting of the checkpoint started flag therefore alters the manner in which signatures are generated for metadata pages in a manner that allows checkpoint pages to be distinguished from non-checkpoint pages within the content addressable storage system 105, such that write operations for the corresponding user can continue without interruption while the checkpoint is being generated.

For example, altering information used to generate signatures for respective ones of the metadata pages in some embodiments comprises changing at least one input of a signature generation algorithm utilized to generate the signatures for the metadata pages from a first value to a second value.

As a more particular example, altering information used to generate signatures for respective ones of the metadata pages comprises changing a particular character used as input to the signature generation algorithm from a first character corresponding to a first ASCII code to a second character corresponding to a second ASCII code, where ASCII denotes American Standard Code for Information Interchange.

In some embodiments, the particular character is a particular letter and the first and second ASCII codes denote respective uppercase and lowercase instances of the particular letter. An arrangement of this type is utilized in the illustrative embodiment of FIG. 5, with an uppercase letter 'T' being used as one input to a metadata page signature generation algorithm for a checkpoint page and a lowercase letter 't' being used as that input to the metadata page signature generation algorithm for a non-checkpoint page. The resulting metadata page signatures include either the ASCII code for uppercase 'T' or the ASCII code for lowercase 't' depending upon whether the metadata page is a checkpoint page or a non-checkpoint page.

Numerous alternative techniques are possible for altering information used to generate signatures for respective ones of the metadata pages. For example, other embodiments can be configured to change a version number used as input to the metadata page signature generation algorithm from a first version number given by the first value to a second version number given by the second value.

It should be noted in this regard that a given signature generation algorithm can be configured to simply pass certain inputs, such as the above-noted uppercase 'T' or lowercase 't', directly through to its output. Thus, at least one of the inputs may appear in unaltered form in an output signature generated by the signature generation algorithm. Additionally or alternatively, the signature generation algorithm can modify certain inputs in conjunction with the generation of the signature.

The altered information is illustratively common to each of the new write operations generated for the corresponding user after the setting of the checkpoint started flag. User data and metadata pages generated after the setting of the checkpoint started flag are referred to herein as non-checkpoint pages or post-checkpoint pages as those pages are potentially distinct from the checkpoint pages for which write operations were entered in the write journal as of the setting of the checkpoint started flag.

A wide variety of other adjustments can be made to alter the manner in which metadata page signatures are generated as disclosed herein. For example, the signature generation algorithm itself can be altered, rather than one or more of its inputs.

The present embodiment is advantageously configured such that the given checkpoint is initiated responsive to a request from a corresponding user and yet the user need not suspend its write operations while the given checkpoint is being generated. The given checkpoint is effectively generated atomically in the non-atomic persistent storage environment of the content addressable storage system 105.

In some embodiments, the given checkpoint comprises an online system checkpoint that maintains a consistent point in time image of system state characterizing volume configuration, logical volume space and associated physical data storage for at least a portion of the storage system.

A "checkpoint" as the term is broadly used herein can be an online system checkpoint or other type of checkpoint. It may be performed in accordance with a periodic checkpointing schedule or on demand, or under other conditions.

A checkpoint object for the given checkpoint may be stored in a system memory of the storage system. Such a system memory storing checkpoint objects may be separate from the storage devices 106. For example, the system memory may illustratively comprise a central database used for storage of critical metadata and other information in the content addressable storage system 105.

Further details regarding checkpointing of user data and metadata in the content addressable storage system 105 and recovery from a resulting checkpoint will be described below in conjunction with the flow diagram of FIG. 4.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

In one possible distributed implementation of a storage system, the storage system comprises a clustered storage system having a plurality of storage nodes each having a plurality of storage devices. The content addressable storage system 105 may represent a single storage node of such a clustered storage system. Alternatively, the content addressable storage system 105 may represent multiple storage nodes.

The system 100 as illustrated in FIG. 1 comprises additional storage nodes 120 that together with the content addressable storage system 105 form a clustered storage system. Each of the storage nodes of such a system may include separate instances of the set of storage devices 106 and the storage controller 108, as well as other system components.

It is also possible for the storage controller 108 to be implemented in a distributed manner so as to comprise a plurality of distributed storage controller components implemented on respective ones of the storage nodes of the clustered storage system.

In some embodiments, the storage controller 108 comprises at least a portion of a system-wide management module ("SYM module") comprising or otherwise having access to the above-noted system memory for storage of critical metadata. The SYM module may be part of the storage controller 108 or part of a given distributed component thereof in a distributed controller arrangement.

Numerous other arrangements of additional or alternative modules can be utilized in implementing the storage controller 108. For example, in embodiments in which the content addressable storage system 105 is implemented using an XtremIO™ storage array, the storage controller 108 can include distributed components such as control modules ("C-modules") and data modules ("D-modules") suitably modified to implement the user data and metadata checkpointing techniques disclosed herein.

Although illustratively shown as being implemented within the content addressable storage system 105, the storage controller 108 in other embodiments can be implemented at least in part within the computer system 101, in another system component, or as a stand-alone component coupled to the network 104.

It is to be appreciated that these and other features of illustrative embodiments are presented by way of example only, and should not be construed as limiting in any way. Accordingly, different numbers, types and arrangements of system components such as computer system 101, compute nodes 102, network 104, content addressable storage system 105, storage devices 106, storage controller 108 and write journals 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments a given content addressable storage system or other type of storage system with functionality for checkpointing of metadata in a user data area can be offered to cloud infrastructure customers or other users as a PaaS offering.

The operation of the information processing system 100 will now be described in further detail with reference to the flow diagram of the example embodiment of FIG. 4. The process as shown includes steps 400 through 412, and is suitable for use in the system 100 but is more generally applicable to other types of information processing systems comprising a content addressable storage system or other type of storage system.

In step 400, generation of a checkpoint is initiated in the storage system. It is assumed that the checkpoint to be generated involves checkpointing of at least a portion of the user data and metadata of the storage system, such as user data and metadata associated with a particular user or with a particular LUN or LUNs of that user.

In step 402, a checkpoint started flag is set for the given checkpoint. Such a flag illustratively comprises a single bit that is set to a logic '1' value to set the flag and reset to a logic '0' value to clear the flag. The checkpoint started flags 118 in the FIG. 1 embodiment can include multiple such single-bit values, each corresponding to a different checkpoint to be generated within the content addressable storage system 105. Other types of flags and associated setting and resetting logic can be used. For example, in some embodiments, it may be desirable to use multi-bit flags. The term "flag" as used herein is intended to be broadly construed and should not be interpreted as being limited to single-bit values.

In step 404, user data pages and metadata pages for write operations already entered in a write journal of the storage system as of the setting of the checkpoint started flag are marked as checkpoint pages.

In step 406, user data pages and metadata pages for new write operations entered in the write journal after the setting of the checkpoint started flag are marked as non-checkpoint pages. Such pages are also referred to in the context of other embodiments herein as post-checkpoint pages, in that write operations involving such pages are entered in the write journal after the checkpoint started flag has been set.

The marking of user data pages and metadata pages as non-checkpoint pages is achieved in the present embodiment by altering information used to generate signatures for respective ones of the metadata pages. Accordingly, metadata pages characterizing the same user data pages subject to write operations at different times will have different signatures depending on whether or not the checkpoint started flag was set when its corresponding write operation was entered in the write journal. Such an arrangement allows checkpoint pages to be readily distinguished from non-checkpoint pages in conjunction with generation of a given checkpoint in the example process of FIG. 4.

As indicated previously, altering information used to generate signatures for respective ones of the metadata pages in some embodiments comprises changing at least one input of a signature generation algorithm utilized to generate the signatures for the metadata pages from a first value to a second value.

Altering the signatures of the metadata pages illustratively causes those pages to be stored at different locations within the content addressable storage system, thereby ensuring that the corresponding user data pages characterized by the metadata pages are also distinguishable as checkpoint pages or non-checkpoint pages. More particularly, maintaining different versions of the metadata pages associated with new write operations effectively ensures that different versions of the associated user data pages are also maintained within the content addressable storage system, because content-based signatures and other metadata used to describe the user data pages is stored in the metadata pages.

Terms such as "mark" and "marking" as used herein in conjunction with checkpoint pages and non-checkpoint pages are intended to be broadly construed so as to encompass a wide variety of different arrangements for allowing checkpoint pages to be distinguished from non-checkpoint pages while also ensuring that the content addressable storage system maintains separate versions of those pages.

In step 408, the write journal is destaged in a manner that gives priority to checkpoint pages over non-checkpoint pages at each of a plurality of amortization levels of the write journal. For example, in some embodiments, the write journal comprises multiple amortization levels each corresponding to different numbers of changes made to the corresponding pages at each of the levels. Additional details regarding example amortization orders in a given embodiment will be provided below. Other embodiments can be configured in which the write journal does not include amortization levels. In such embodiments, checkpoint pages are simply given priority over non-checkpoint pages in destaging from the write journal.

In step 410, after all of the checkpoint pages have been destaged from the write journal, the checkpoint started flag for the given checkpoint is reset. The process for generating the given checkpoint is therefore complete, and the checkpoint can be used for recovery.

In step 412, at least the checkpoint pages are utilized to recover from the checkpoint at some subsequent point in time. For example, the storage controller can support multiple recovery modes, including a mode in which recovery from the checkpoint is performed utilizing only the checkpoint pages.

It is also possible to recover using the latest available user data pages and metadata pages by utilizing both checkpoint pages and non-checkpoint pages. In such an arrangement, where a given user data or metadata page has both a checkpoint page and a non-checkpoint page available, the more recent non-checkpoint page can be used in place of the checkpoint page. Other recovery modes involving checkpoint pages, non-checkpoint pages or combinations of checkpoint pages and non-checkpoint pages can be used.

Figure 4:
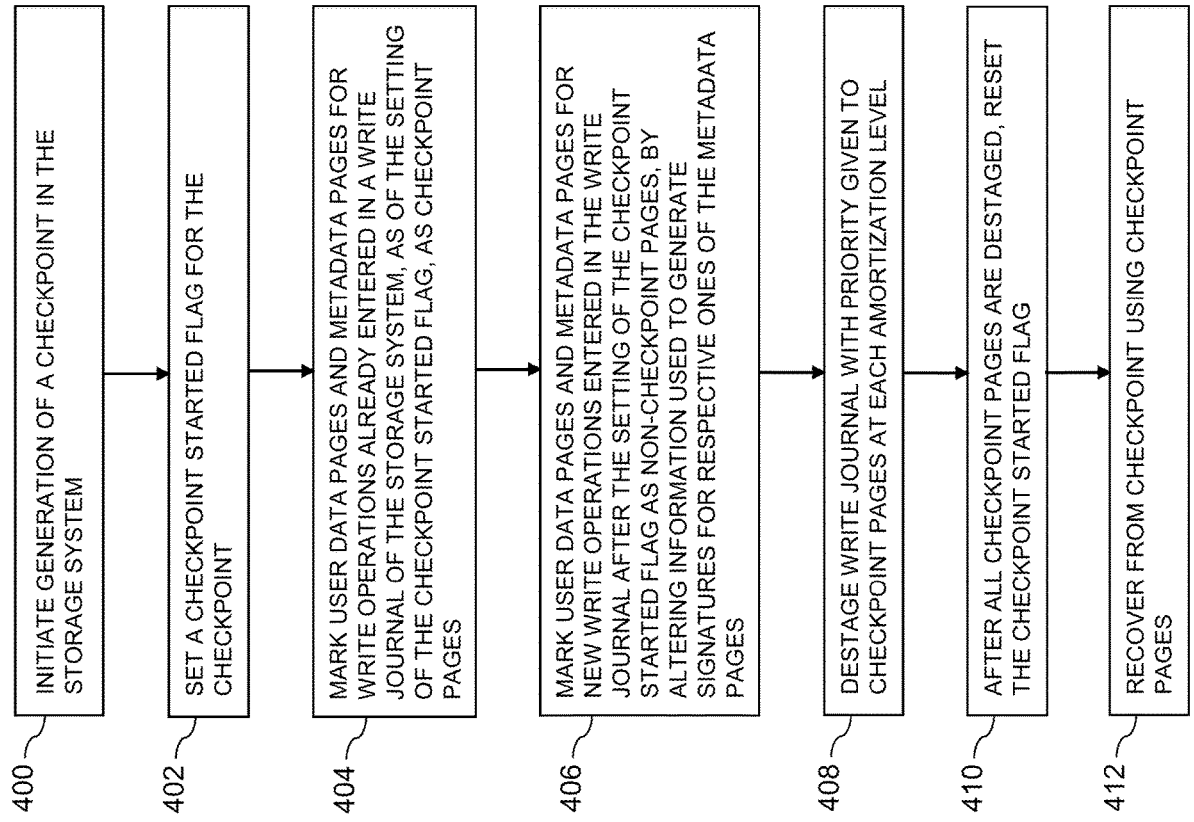
FIG. 4 is a flow diagram of a process for checkpointing of user data and metadata in a content addressable storage system in an illustrative embodiment.

In the context of the FIG. 1 embodiment, the storage controller 108 of content addressable storage system 105 is illustratively configured to control the performance of steps 400 through 412 of the FIG. 4 process. Other system entities can additionally or alternatively be utilized to control or execute one or more of these steps.

A more particular example of capture of and recovery from user data and metadata checkpoints in an illustrative embodiment utilizing an implementation of the FIG. 4 process will now be described. It is assumed for this example that the content addressable storage system comprises an XtremIO™ storage array suitably modified to incorporate user data and metadata checkpointing techniques as disclosed herein. The metadata to be checkpointed comprises hash metadata (HMD) of the XtremIO™ storage array. The checkpoint in such an embodiment is illustratively an online system checkpoint that maintains a consistent point in time image of system state characterizing volume configuration, logical volume space and associated physical data storage. In the event that the storage system fails to come up regularly due to a data/metadata inconsistency, the previous state can be easily recovered using the persistent checkpoint image. The HMD in this example is the metadata of the XtremIO™ storage array, and provides a mapping from page digests based on page content to page physical locations.

This embodiment assumes a page size of 8 KB, or more particularly 8192 bytes. Other page sizes may be used in other embodiments. Also, the HMD is assumed to be stored in a metadata area in "buckets," with each such bucket containing multiple 64B cache lines, although other HMD configurations can be used.

It is further assumed that the XtremIO™ storage array is configured in a RAID6 configuration, although other storage redundancy configurations can be used. In such an embodiment, the HMD may be checkpointed or "dumped" to the user data area because the metadata area is of limited size and is utilized for other purposes. The user data area in this embodiment is assumed to have no predefined locations for storing such checkpointed metadata, and so the locations of the individual pages of checkpointed metadata within the user data area have to be tracked and stored. This may be achieved using the multi-level location arrays mentioned previously and described in greater detail in the above-cited U.S. patent application Ser. No. 15/637,613. It should be understood, however, that embodiments herein do not require checkpointing of metadata into a user data area, nor do such embodiments require the use of multi-level location arrays.

The checkpointing process in this embodiment is as follows:

1. Upon user request for a checkpoint, set a corresponding checkpoint started flag.

2. Responsive to setting of the checkpoint started flag, mark all user data and metadata pages for which write operations have already been entered in the write journal as checkpoint pages, and mark any user data and metadata pages for new write operations entered in the write journal after the setting of the checkpoint started flag as non-checkpoint pages. The latter marking is achieved by altering at least one input to a signature generation algorithm used to generate the metadata pages characterizing the user data pages.

3. Destage the write journal based on amortization order but within a given amortization level give priority to checkpoint pages over non-checkpoint pages. Eventually all checkpoint pages will be destaged.

4. After all the checkpoint pages have been destaged, reset the checkpoint started flag so that the previously-altered input of the metadata page signature generation algorithm returns to its normal configuration.

The alteration of the input to the metadata page signature generation algorithm in step 2 above ensures that all new write operations entered in the write journal after the setting of the checkpoint started flag will result in non-checkpoint metadata pages with different signatures such that those metadata pages will be persisted at different locations in the content addressable storage system. Accordingly, no overwrite of user data and metadata due to new write operations will change the user data and metadata that has been persisted as checkpoint pages in conjunction with generation of the checkpoint.

If the user wants to recover using checkpoint pages only, those pages are loaded into the system and any non-checkpoint pages can be discarded.

Alternatively, if the user want to recover using the most up-to-date data including any available non-checkpoint pages, the system checks for each page whether or not there is a non-checkpoint version of that page. If there is a non-checkpoint page, the system loads that page, and if not, it loads the checkpoint page.

In the above-described XtremIO™ storage array example, each user data page has a size of 8 KB and its content-based signature is a 20-byte signature generating using an SHA1 hash function. Also, each page has a LUN identifier and an offset, and so is characterized by <lun_id, offset, signature>.

As mentioned previously, storage controller components in an XtremIO™ storage array illustratively include C-module and D-module components. For example, separate instances of such components can be associated with each of a plurality of storage nodes in a clustered storage system implementation. The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, and then the metadata page signature is computed and the metadata page is read using the computed signature. In this embodiment, the metadata page signature is more particularly computed using a signature generation algorithm that generates the signature to include a hash of the 8-byte metadata page identifier, and the ASCII code for the uppercase letter 'T', as well as possible additional fields. The last bit of the metadata page signature is illustratively always set to a '1' so as to distinguish it from the user data page signature which always has a last bit of '0'.

The metadata page signature is used to retrieve the metadata page via the D-module. This metadata page will include the <lun_id, offset, signature> for the user data page if the user page exists. The signature of the user data page is then used to retrieve that user data page, also via the D-module.

In the above-described checkpointing process, the input to the metadata page signature generation algorithm is altered to replace the uppercase 'T' with the lowercase T such that the ASCII code for the lowercase 't' appears in the output signature in place of the ASCII code for the uppercase 'T'.

As a result, after the checkpoint started flag has been set, all new write operations will result in metadata pages having signatures based on the lowercase 't' instead of the uppercase 'T'. The D-module will therefore keep both the checkpoint page and the non-checkpoint page for each such metadata page associated with a new write operation.

Accordingly, before recovering from a checkpoint or deleting a checkpoint, a user can check whether or not a post-checkpoint metadata page exists for one or more user data pages. The post-checkpoint metadata page is indicated by the altered signature that in the present example includes the ASCII code for a lowercase 't' instead of the ASCII code for the uppercase 'T' as described above. The post-checkpoint metadata page is used in place of the corresponding checkpoint page if the user wants to use the most up-to-date data rather than to simply recover from the checkpoint.

The write journal in the present example is assumed to comprise a list of lists for a given journal type. The list of lists more particularly comprises a list of amortization levels each of which may have multiple pages associated therewith. The amortization level illustratively indicates the number of entries that have been changed in each of the pages at that level. For example, if three entries have changed for a given journal page, that page is put on the list of pages for amortization level 3. If five entries have changed, the page is put on the list of pages for amortization level 5.

The write journal in some embodiments includes 129 distinct amortization levels, with levels 0 to 127 indicating that pages on the lists for those levels have the corresponding number of changed entries, with level 128 including pages with that number or more of changed entries, although it should be understood that different numbers of amortization levels can be used in other embodiments.

Pages move between the amortization levels as new write operations are entered into the write journal. For example, if a page with three changed entries is still in the write journal and one additional entry on that page is changed, the page will be moved from the list for level 3 to the list for level 4.

In destaging pages from the write journal, the process starts with the highest amortization level first, which is level 128 in the present example, and moves downward through the levels. This is an instance of what is referred to herein as an "amortization order." In normal operation outside of the checkpointing context, the system may be configured such that only a designated portion of the pages are destaged from the write journal, so as to conserve computational resources. However, in the checkpoint context, as indicated above, all of the checkpoint pages, even those associated with low amortization levels, are eventually destaged from the write journal in order to persist the corresponding checkpoint. This process proceeds from the highest amortization level towards the lowest amortization level, with priority given at each level to the checkpoint pages over the non-checkpoint pages. At each level, and before moving to the next lowest level, all pages are destaged, including both checkpoint pages and non-checkpoint pages, but the checkpoint pages are destaged first. This may be achieved by entering the checkpoint pages at the head rather than the tail of the lists for the respective amortization levels.

The user data and metadata checkpointing processes of the XtremIO™ storage array example described above can be varied in other embodiments. For example, different signature formats and signature generation algorithms can be used. In addition, functionality associated with D-module and C-module components of the XtremIO™ storage array can be incorporated into other modules or components of a centralized or distributed storage controller in other types of storage systems.

It is also to be appreciated that the FIG. 4 process and other checkpointing and recovery features and functionality described above can be adapted for use with other types of information systems, including by way of example an information processing system in which one or more compute nodes and a corresponding storage system are all implemented on the same processing platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations involving checkpointing of user data and metadata in a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different checkpoints for respective different users within a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 4 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the compute nodes 102 or on storage nodes of the content addressable storage system 105.

Referring now to FIG. 5, another illustrative embodiment is shown. In this embodiment, pseudocode 500 is executed by or under the control of a storage controller of a content addressable storage system, such as the storage controller 108 of the content addressable storage system 105, or another type of storage controller. For example, the pseudocode 500 may be viewed as comprising a portion of a software implementation of at least part of the storage controller 108 of the FIG. 1 embodiment.

The pseudocode 500 illustrates a process for retrieving a metadata page based on whether the metadata page is marked as a checkpoint page or a non-checkpoint page in conjunction with generation of a given checkpoint. In this embodiment, checkpoint pages are distinguished by metadata page signatures that are generated using an uppercase 'T' as one input to the metadata page signature generation algorithm, while non-checkpoint pages are distinguished by metadata page signatures that are generated using a lowercase 't' as that same input to the metadata page signature generation algorithm. The resulting metadata page signature illustratively includes the ASCII code for the uppercase 'T' or the ASCII code for the lowercase 't' depending upon whether it is a checkpoint page or a non-checkpoint page, respectively. The non-checkpoint pages are also referred to in the context of this embodiment as post-checkpoint ("post-CKPT") pages as such pages are associated with new write operations entered into the write journal after the checkpoint started flag has been set.

It is to be appreciated that this particular pseudocode shows just one example implementation of a process for retrieving a metadata page based on whether the metadata page is marked as a checkpoint page or a non-checkpoint page, and alternative implementations of the process can be used in other embodiments.

Illustrative embodiments of content addressable storage systems or other types of storage systems with user data and metadata checkpointing functionality as disclosed herein can provide a number of significant advantages relative to conventional arrangements.

For example, some embodiments can advantageously provide significantly improved checkpointing of user data and metadata in a content addressable storage system or other type of storage system.

More particularly, these embodiments can be configured to checkpoint user data and metadata atomically in a non-atomic persistent storage environment, thereby allowing users to continue to write normally while checkpoints are generated.

Such arrangements overcome the difficulties that would otherwise be associated with interruption of write operations for a given user while a checkpoint is being generated for that user. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102 and content addressable storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
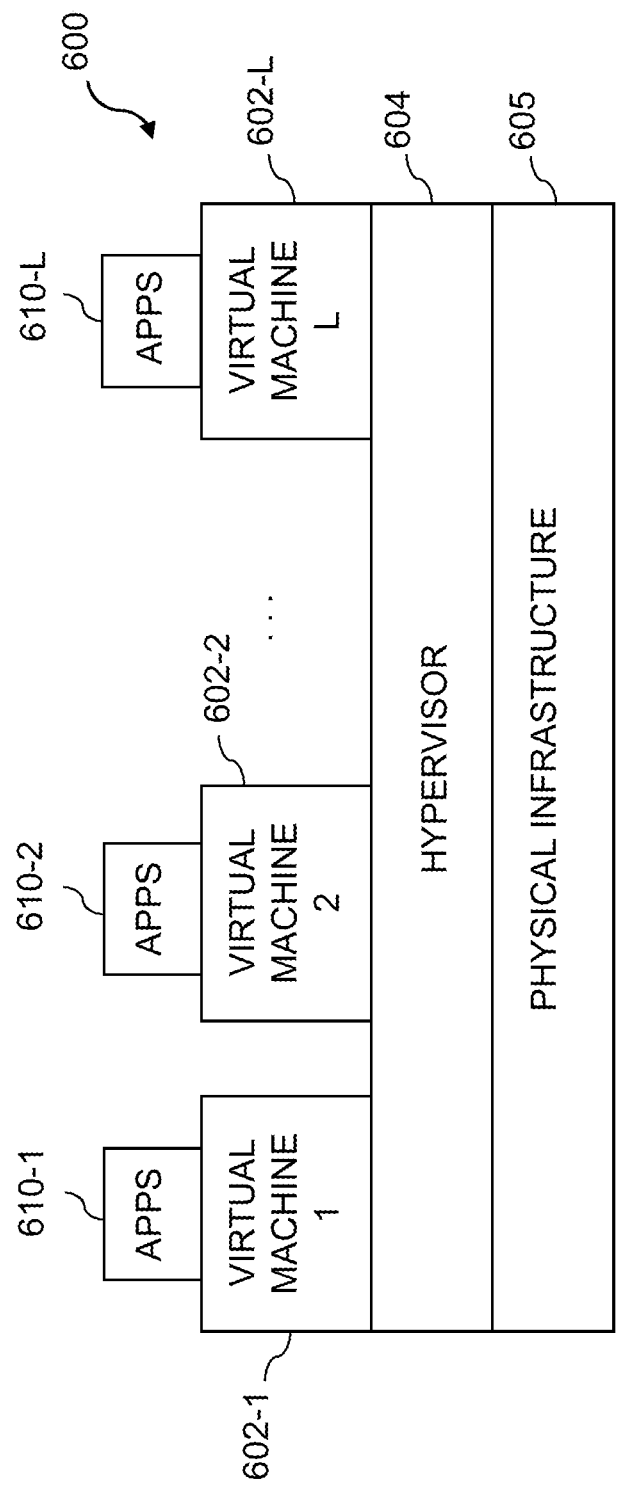

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute nodes 102 and the content addressable storage system 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computer systems, compute nodes, storage systems, storage devices, storage controllers write journals, user data and metadata page configurations, and signature generation algorithms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and an associated storage controller;
the storage controller being configured to initiate generation of one or more checkpoints in the storage system;
the checkpoints being generated for user data pages and metadata pages, each of the metadata pages characterizing a plurality of the user data pages;
wherein in conjunction with initiation of a given one of the checkpoints in the storage system, the storage controller is configured:
to set a checkpoint started flag for the given checkpoint;
to mark user data pages and metadata pages for write operations already entered in a write journal of the storage system as of the setting of the checkpoint started flag as checkpoint pages;
to mark user data pages and metadata pages for new write operations entered in the write journal after the setting of the checkpoint started flag as non-checkpoint pages by altering information used to generate signatures for respective ones of the metadata pages; and
to destage the write journal with priority being given to checkpoint pages over non-checkpoint pages at each of a plurality of amortization levels of the write journal, the amortization levels being indicative of different numbers of changes made to corresponding ones of the pages at those levels;
wherein metadata pages characterizing the same user data pages subject to write operations at different times thereby have different signatures depending on whether or not the checkpoint started flag was set when its corresponding write operation was entered in the write journal;
wherein altering information used to generate signatures for respective ones of the metadata pages comprises altering information other than the checkpoint started flag;
wherein altering information used to generate signatures for respective ones of the metadata pages comprises changing at least one input of a signature generation algorithm utilized to generate the signatures for the metadata pages from a first value to a second value; and
wherein the storage controller is implemented using at least one processing device comprising a processor coupled to a memory.

2. The apparatus of claim 1 wherein the user data pages and the metadata pages are configured such that:
each of the user data pages is characterized by a logical unit identifier, an offset and a content-based signature with the content-based signature being generated as a hash function of content of the user data page; and
each of the metadata pages having a signature that is not content-based and characterizing a different set of the user data pages.

3. The apparatus of claim 1 wherein altering information used to generate signatures for respective ones of the metadata pages comprises changing a particular character used as input to the signature generation algorithm from a first character corresponding to a first ASCII code to a second character corresponding to a second ASCII code.

4. The apparatus of claim 3 wherein the particular character is a particular letter and the first and second ASCII codes denote respective uppercase and lowercase instances of the particular letter.

5. The apparatus of claim 1 wherein altering information used to generate signatures for respective ones of the metadata pages comprises changing a version number used as input to the signature generation algorithm from a first version number given by the first value to a second version number given by the second value.

6. The apparatus of claim 1 wherein the altered information is common to each of the new write operations.

7. The apparatus of claim 1 wherein the given checkpoint is initiated responsive to a request from a corresponding user and wherein the user need not suspend its write operations while the given checkpoint is being generated.

8. The apparatus of claim 1 wherein the given checkpoint is effectively generated atomically in a non-atomic persistent storage environment of the storage system.

9. The apparatus of claim 1 wherein the given checkpoint comprises an online system checkpoint that maintains a consistent point in time image of system state characterizing volume configuration, logical volume space and associated physical data storage for at least a portion of the storage system.

10. The apparatus of claim 1 wherein the storage system comprises a clustered storage system having a plurality of storage nodes each having a plurality of storage devices.

11. The apparatus of claim 10 wherein the storage controller is implemented in a distributed manner so as to comprise a plurality of distributed storage controller components implemented on respective ones of the storage nodes of the clustered storage system.

12. The apparatus of claim 1 wherein the storage controller is configured:
after all of the checkpoint pages have been destaged from the write journal, to reset the checkpoint started flag.

13. The apparatus of claim 1 wherein the storage controller is configured to support at least one of the following recovery modes:
to recover from the given checkpoint utilizing only the checkpoint pages; and
to recover using latest available user data pages and metadata pages by utilizing both checkpoint pages and non-checkpoint pages.

14. A method comprising:
in conjunction with the generation of a given one of a plurality of checkpoints in a storage system comprising a plurality of storage devices:
setting a checkpoint started flag for the given checkpoint;
marking user data pages and metadata pages for write operations already entered in a write journal of the storage system as of the setting of the checkpoint started flag as checkpoint pages;
marking user data pages and metadata pages for new write operations entered in the write journal after the setting of the checkpoint started flag as non-checkpoint pages by altering information used to generate signatures for respective ones of the metadata pages; and
destaging the write journal with priority being given to checkpoint pages over non-checkpoint pages at each of a plurality of amortization levels of the write journal, the amortization levels being indicative of different numbers of changes made to corresponding ones of the pages at those levels;
wherein metadata pages characterizing the same user data pages subject to write operations at different times thereby have different signatures depending on whether or not the checkpoint started flag was set when its corresponding write operation was entered in the write journal;
wherein altering information used to generate signatures for respective ones of the metadata pages comprises altering information other than the checkpoint started flag;
wherein altering information used to generate signatures for respective ones of the metadata pages comprises changing at least one input of a signature generation algorithm utilized to generate the signatures for the metadata pages from a first value to a second value; and wherein the method is implemented by at least one processing device comprising a processor coupled to a memory.

15. The method of claim 14 further comprising:
after all of the checkpoint pages have been destaged from the write journal, resetting the checkpoint started flag.

16. A computer program product comprising a non-transitory processor-readable storage medium having stored therein program code of one or more software programs, wherein the program code when executed by at least one processing device causes said at least one processing device:
in conjunction with the generation of a given one of a plurality of checkpoints in a storage system comprising a plurality of storage devices:
to set a checkpoint started flag for the given checkpoint;
to mark user data pages and metadata pages for write operations already entered in a write journal of the storage system as of the setting of the checkpoint started flag as checkpoint pages;
to mark user data pages and metadata pages for new write operations entered in the write journal after the setting of the checkpoint started flag as non-checkpoint pages by altering information used to generate signatures for respective ones of the metadata pages; and
to destage the write journal with priority being given to checkpoint pages over non-checkpoint pages at each of a plurality of amortization levels of the write journal, the amortization levels being indicative of different numbers of changes made to corresponding ones of the pages at those levels;
wherein metadata pages characterizing the same user data pages subject to write operations at different times thereby have different signatures depending on whether or not the checkpoint started flag was set when its corresponding write operation was entered in the write journal;
wherein altering information used to generate signatures for respective ones of the metadata pages comprises altering information other than the checkpoint started flag; and
wherein altering information used to generate signatures for respective ones of the metadata pages comprises changing at least one input of a signature generation algorithm utilized to generate the signatures for the metadata pages from a first value to a second value.

17. The computer program product of claim 16 wherein the program code when executed by said at least one processing device further causes said at least one processing device:
after all of the checkpoint pages have been destaged from the write journal, to reset the checkpoint started flag.

18. The computer program product of claim 16 wherein altering information used to generate signatures for respective ones of the metadata pages comprises changing a particular character used as input to the signature generation algorithm from a first character corresponding to a first ASCII code to a second character corresponding to a second ASCII code.

19. The computer program product of claim 18 wherein the particular character is a particular letter and the first and second ASCII codes denote respective uppercase and lowercase instances of the particular letter.

20. The computer program product of claim 16 wherein altering information used to generate signatures for respective ones of the metadata pages comprises changing a version number used as input to the signature generation algorithm from a first version number given by the first value to a second version number given by the second value.

\* \* \* \* \*